(12) United States Patent
Chen et al.

(10) Patent No.: US 11,312,028 B2
(45) Date of Patent: Apr. 26, 2022

(54) MULTI-AXIS ROBOT ARM

(71) Applicant: Cheng Uei Precision Industry Co., LTD., New Taipei (TW)

(72) Inventors: Ming-Tsung Chen, New Taipei (TW); Jun-Wei Huang, New Taipei (TW); Pei-Fen Wu, New Taipei (TW); Jung-Kuang Liu, New Taipei (TW); Kun-Cheng Li, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 50 days.

(21) Appl. No.: 17/017,607

(22) Filed: Sep. 10, 2020

(65) Prior Publication Data
US 2021/0138668 A1    May 13, 2021

(30) Foreign Application Priority Data
Nov. 12, 2019  (TW) .................................. 108214991

(51) Int. Cl.
| B25J 17/00 | (2006.01) |
| B25J 17/02 | (2006.01) |
| B25J 18/00 | (2006.01) |
| B25J 18/02 | (2006.01) |
| B25J 9/08  | (2006.01) |
| B25J 19/00 | (2006.01) |

(52) U.S. Cl.
CPC .............. *B25J 18/025* (2013.01); *B25J 9/08* (2013.01); *B25J 19/0029* (2013.01)

(58) Field of Classification Search
CPC .... B25J 18/0025; B25J 19/08; B25J 19/0029; B25J 18/02
See application file for complete search history.

(56) References Cited

U.S. PATENT DOCUMENTS

| 5,733,096 A   | * | 3/1998 | Van Doren ............ B25J 18/025 212/296 |
| 2015/0190934 A1 | * | 7/2015 | Chiu ......................... B25J 9/08 74/490.01 |
| 2015/0230870 A1 | * | 8/2015 | Jiang ..................... B25J 18/025 74/490.05 |

* cited by examiner

*Primary Examiner* — Jake Cook
(74) *Attorney, Agent, or Firm* — Cheng-Ju Chiang

(57) ABSTRACT

A multi-axis robot arm includes a pedestal, a plurality of knuckle modules and at least one telescopic arm module. Two ends of two adjacent knuckle modules close to and facing each other have a first connecting structure and a second connecting structure, respectively. The at least one telescopic arm module includes a telescopic tube and a telescopic shaft. One end of the telescopic tube is fastened to the first connecting structure. A surface of the other end of the telescopic tube faces towards the second connecting structure. One end of the telescopic shaft facing towards the first connecting structure projects into the telescopic tube. The other end of the telescopic shaft is fastened to the second connecting structure. The one end of the telescopic shaft is telescopically connected with and fastened in the telescopic tube.

12 Claims, 12 Drawing Sheets

MULTI-AXIS ROBOT ARM

CROSS-REFERENCE TO RELATED APPLICATION

The present application is based on, and claims priority from, Taiwan Patent Application No. 108214991, filed Nov. 12, 2019, the disclosure of which is hereby incorporated by reference herein in its entirety.

BACKGROUND OF THE INVENTION

1. Field of the Invention

The present invention generally relates to a robot arm, and more particularly to a multi-axis robot arm.

2. The Related Art

With the increasingly rapid development of science and technology, conventional multi-axis robot arms are more and more used, and the conventional multi-axis robot arms are more and more used particularly in industrial productions. Currently, the conventional multi-axis robot arm generally includes a plurality of knuckle modules, and a plurality of arm modules of which each is fixed to and connected between two knuckle modules. However, the current arm module connected between the two knuckle modules basically has a constant length structure, so a length variation has no way of being changed, and a usage scope of the multi-axis robot arm is severely restricted, correspondingly the conventional multi-axis robot arm can just be restrictedly used in a specific situation.

Therefore, it is essential to provide a multi-axis arm module which is telescopic to be able to appropriate for different usage needs, so that a usage scope of the multi-axis robot arm is improved.

SUMMARY OF THE INVENTION

An object of the present invention is to provide a multi-axis robot arm. The multi-axis robot arm includes a pedestal, a plurality of knuckle modules and at least one telescopic arm module. Two ends of two adjacent knuckle modules close to and facing each other have a first connecting structure and a second connecting structure, respectively. The at least one telescopic arm module includes a telescopic tube and a telescopic shaft. One end of the telescopic tube is connected with and fastened to the first connecting structure. A surface of the other end of the telescopic tube faces towards the second connecting structure. One end of the telescopic shaft facing towards the first connecting structure projects into the telescopic tube. The other end of the telescopic shaft is fastened to and connected with the second connecting structure. The one end of the telescopic shaft is telescopically connected with and fastened in the telescopic tube. The telescopic shaft is axially retracted into or stretched out of the telescopic tube with respect to the telescopic tube. The telescopic shaft is fastened to at least two different fastening positions of the telescopic tube by a plurality of fastening elements. The at least one telescopic arm module, and the plurality of the knuckle modules together with the first connecting structures and the second connecting structures of the plurality of the knuckle modules are fastened to the pedestal.

Another object of the present invention is to provide a multi-axis robot arm. The multi-axis robot arm includes a pedestal, a first knuckle module connected with a top of the pedestal, a second knuckle module connected with one side of the first knuckle module, a third knuckle module located above the second knuckle module, two first connecting structures, two second connecting structures, two telescopic arm modules, a fourth knuckle module, a fifth knuckle module and a sixth knuckle module. A bottom of the third knuckle module has one first connecting structure. A top of the second knuckle module has one second connecting structure facing to the one first connecting structure. One side of the third knuckle module is connected with the other second connecting structure. One telescopic arm module is connected between the one first connecting structure and the one second connecting structure. The one telescopic arm module is connected between the second knuckle module and the third knuckle module. A bottom of the fourth knuckle module is connected with the other first connecting structure facing to the other second connecting structure, the other telescopic arm module is connected between the other first connecting structure and the other second connecting structure. The other telescopic arm module is connected between the third knuckle module and the fourth knuckle module. The fourth knuckle module, the other first connecting structure and the other second connecting structure are located above the pedestal. One side of the fifth knuckle module is connected with the fourth knuckle module. A top of the fifth knuckle module is connected with a bottom of the sixth knuckle module. The sixth knuckle module and the fifth knuckle module are located above the third knuckle module.

Another object of the present invention is to provide a multi-axis robot arm. The multi-axis robot arm includes a pedestal, a first knuckle module connected with a top of the pedestal, a second knuckle module connected with one side of the first knuckle module, a third knuckle module located above the second knuckle module, two first connecting structures, two second connecting structures, a bending tube, two telescopic arm modules, a fourth knuckle module, a fifth knuckle module and a sixth knuckle module. A bottom of the third knuckle module has one first connecting structure. A top of the second knuckle module has one second connecting structure facing to the one first connecting structure. One side of the third knuckle module is connected with the bending tube, and the bending tube is located above the first knuckle module. A top of the bending tube has the other second connecting structure. The one side of the third knuckle module is connected with the other second connecting structure by the bending tube. One telescopic arm module is connected between the one first connecting structure and the one second connecting structure. The one telescopic arm module is connected between the second knuckle module and the third knuckle module. A bottom of the fourth knuckle module is connected with the other first connecting structure facing to the other second connecting structure. The other telescopic arm module is connected between the other first connecting structure and the other second connecting structure. The other telescopic arm module is connected between the third knuckle module and the fourth knuckle module. The fourth knuckle module, the other first connecting structure, the other second connecting structure and the bending tube are located above the pedestal. One side of the fifth knuckle module is connected with the fourth knuckle module. A top of the fifth knuckle module is connected with a bottom of the sixth knuckle module. The sixth knuckle module and the fifth knuckle module are located above the third knuckle module.

As described above, the multi-axis robot arm includes the at least one telescopic arm module, the at least one telescopic arm module includes the telescopic tube and the telescopic shaft which are cooperated with each other, a length of the at least one telescopic arm module is steadily modulated by virtue of the telescopic shaft being axially stretched out of or retracted into the telescopic tube, when the telescopic shaft is stretched out of or retracted into the telescopic tube to generate different lengths of the telescopic shaft exposed out of the telescopic tube, the telescopic shaft is realized to be fastened to the telescopic tube by the action of the plurality of the fastening elements, so that when the at least one telescopic arm module has different lengths, the at least one telescopic arm module is used reliably to make the multi-axis robot arm appropriate to different usage needs for improving a usage scope of the multi-axis robot arm.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
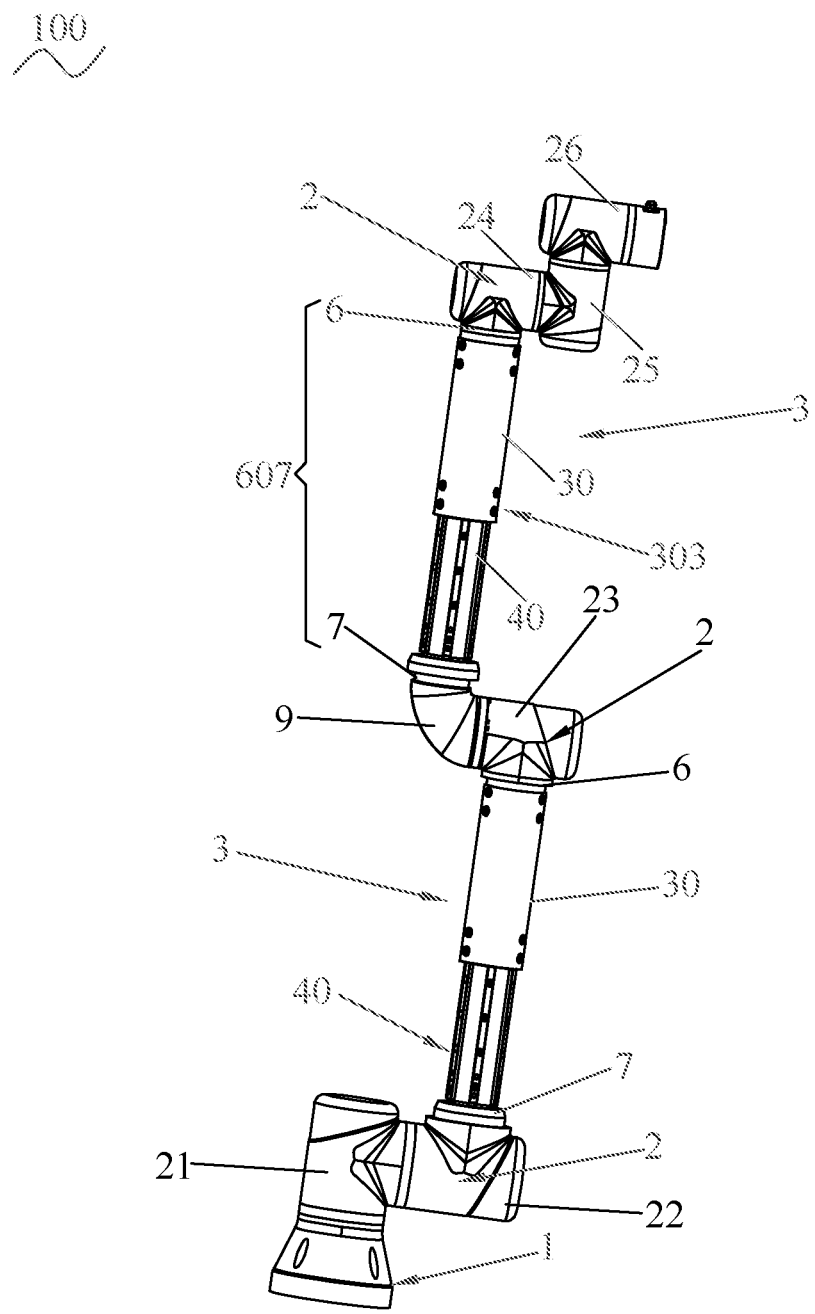
FIG. 1 is a diagrammatic drawing of a multi-axis robot arm in accordance with a preferred embodiment of the present invention, wherein the multi-axis robot arm is located at a stretched status.
Figure 2:
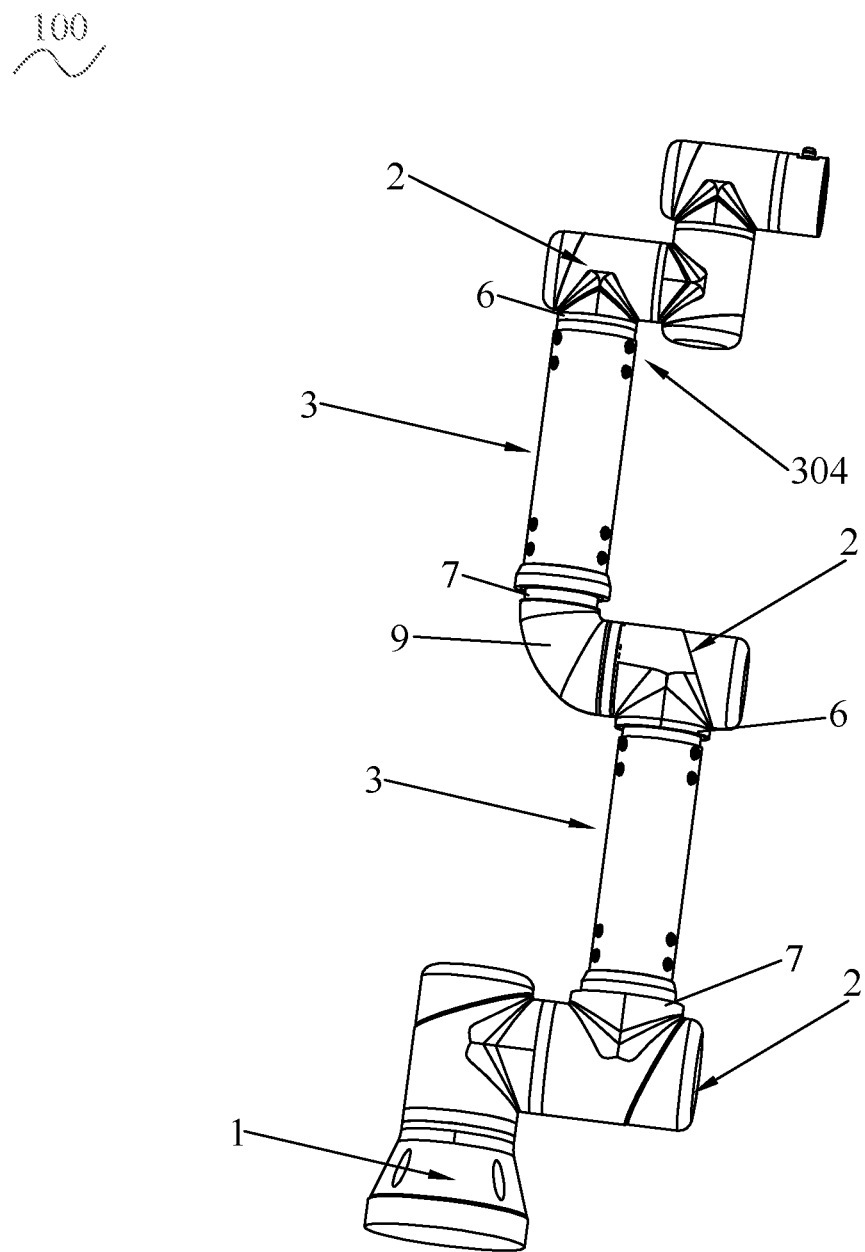
FIG. 2 is another diagrammatic drawing of the multi-axis robot arm in accordance with the preferred embodiment of the present invention, wherein the multi-axis robot arm is located at a retracted status.

With reference to FIG. 1 to FIG. 2, a multi-axis robot arm 100 in accordance with a preferred embodiment of the present invention is shown. The multi-axis robot arm 100 includes a pedestal 1, a plurality of knuckle modules 2 and at least one telescopic arm module 3.

Figure 3:
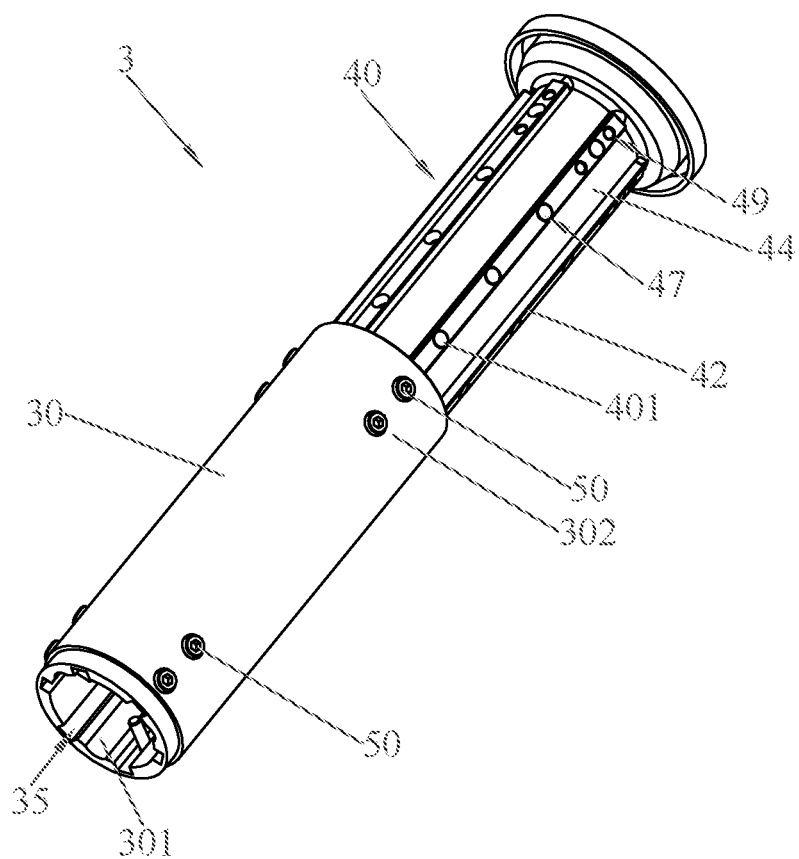
FIG. 3 is a diagrammatic drawing showing that a telescopic arm module of the multi-axis robot arm is located at a stretched status.
Figure 4:
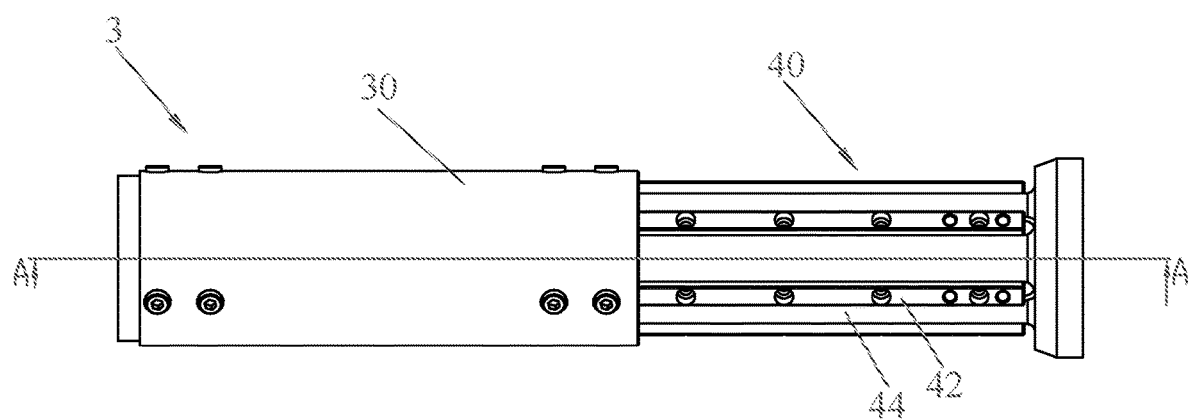
FIG. 4 is a schematic drawing showing that a plane structure of the telescopic arm module of the multi-axis robot arm is located at the stretched status.

With reference to FIG. 1 to FIG. 3, two ends of two adjacent knuckle modules 2 close to and facing each other have a first connecting structure 6 and a second connecting structure 7, respectively. The at least one telescopic arm module 3 is mounted between the first connecting structure 6 and the second connecting structure 7. The at least one telescopic arm module 3, and the plurality of the knuckle modules 2 together with the first connecting structures 6 and the second connecting structures 7 are fastened to the pedestal 1. The at least one telescopic arm module 3 includes a hollow telescopic tube 30 and a telescopic shaft 40. The telescopic tube 30 is of a hollow cylinder shape. One end of the telescopic tube 30 is connected with and fastened to a lower end of the first connecting structure 6. A surface of the other end of the telescopic tube 30 faces towards the second connecting structure 7. A middle of the telescopic tube 30 has a receiving space 301 penetrating through two opposite end surfaces of the telescopic tube 30. One end of the telescopic shaft 40 facing towards the first connecting structure 6 projects into the receiving space 301 of the telescopic tube 30. The one end of the telescopic shaft 40 is telescopically connected with and fastened in the telescopic tube 30. The telescopic shaft 40 is axially retracted into or stretched out of the telescopic tube 30 with respect to the telescopic tube 30.

The other end of the telescopic shaft 40 is fastened to and connected with the second connecting structure 7. The first connecting structure 6 and the second connecting structure 7 are structures which are integrally molded to and formed to the corresponding knuckle modules 2. The first connecting structure 6 and the second connecting structure 7 are without being restricted to be fastened to and connected to the corresponding knuckle modules 2 directly or indirectly.

The multi-axis robot arm 100 includes the at least one telescopic arm module 3. The at least one telescopic arm module 3 includes the telescopic tube 30 and the telescopic shaft 40 which are cooperated with each other. A length of the at least one telescopic arm module 3 is steadily modulated by virtue of the telescopic shaft 40 being axially stretched out of or retracted into the telescopic tube 30. When the telescopic shaft 40 is stretched out of or retracted into the telescopic tube 30 to generate different lengths of the telescopic shaft 40 exposed out of the telescopic tube 30, the telescopic shaft 40 is realized to be fastened to the telescopic tube 30 by the action of a plurality of the fastening elements 50, so that when the at least one telescopic arm module 3 has different lengths, namely the at least one telescopic arm module 3 has different telescopic lengths, the at least one telescopic arm module 3 is used reliably to make the multi-axis robot arm 100 appropriate to different usage needs for improving a usage scope of the multi-axis robot arm 100. The telescopic tube 30 has at least two different fastening positions 302. When at least two different lengths of the telescopic shaft 40 exposed out of the telescopic tube 30 are generated, the telescopic shaft 40 is fastened to the at least two different fastening positions 302 of the telescopic tube 30 by a plurality of fastening elements 50. The plurality of the fastening elements 50 are a plurality of bolts.

With reference to FIG. 3 to FIG. 10, in the present invention, the telescopic shaft 40 has a plurality of threaded holes 41 distributed around a periphery of the telescopic shaft 40. The telescopic tube 30 has a plurality of through-holes 31 distributed around a periphery of the telescopic tube 30. The plurality of the through-holes 31 are corresponding to the plurality of the threaded holes 41. The plurality of the fastening elements 50 pass through the plurality of the through-holes 31, and the plurality of the fastening elements 50 are screwed in the plurality of the threaded holes 41 and connected with inner side walls of the plurality of the threaded holes 41 by a threaded connection way to locate the telescopic shaft 40 to the at least two different fastening positions 302 of the telescopic tube 30. A cooperation among the plurality of the fastening elements 50, the plurality of the through-holes 31 and the plurality of the threaded holes 41 is beneficial for the at least one telescopic arm module 3 to be stably located to the different lengths, in addition, a structure of the at least one telescopic arm module 3 is simple and reliable.

With reference to FIG. 3 to FIG. 10 again, in the present invention, when two different lengths of the telescopic shaft 40 exposed out of the telescopic tube 30 are generated, the telescopic shaft 40 is fastened to two different fastening positions 302 of the telescopic tube 30 by the plurality of fastening elements 50.

When the telescopic shaft 40 is completely stretched out of the telescopic tube 30 to show a largest length of the telescopic shaft 40 exposed out of the telescopic tube 30, the plurality of the threaded holes 41 of an upper portion of the one end of the telescopic shaft 40 facing towards the first connecting structure 6 are corresponding to the plurality of the through-holes 31 of a lower portion of the other end of the telescopic tube 30 facing towards the second connecting structure 7, the upper portion of the one end of the telescopic shaft 40 is fastened to the fastening position 302 of the lower portion of the other end of the telescopic tube 30 by virtue of the plurality of the fastening elements 50 being cooperated with and fastened in the plurality of the through-holes 31 of the lower portion of the other end of the telescopic tube 30 and the plurality of the threaded holes 41 of the upper portion of the one end of the telescopic shaft 40, at the moment, the telescopic shaft 40 is fastened to a stretched position 303 of the at least one telescopic arm module 3 with respect to the telescopic tube 30.

When the telescopic shaft 40 is completely retracted into the telescopic tube 30, the plurality of the threaded holes 41 of two opposite ends of the telescopic shaft 40 are corresponding to the plurality of the through-holes 31 of two opposite ends of the telescopic tube 30, the telescopic shaft 40 is fastened to the at least two fastening positions 302 of the telescopic tube 30 by virtue of the plurality of the fastening elements 50 being cooperated with and fastened in the plurality of the through-holes 31 of the two opposite ends of the telescopic tube 30 and the plurality of the threaded holes 41 of the two opposite ends of the telescopic shaft 40, at the moment, the telescopic shaft 40 is fastened to a retracted position 304 of the at least one telescopic arm module 3 with respect to the telescopic tube 30.

When the telescopic shaft 40 is partially stretched out of the telescopic tube 30 to show a first partial length of the telescopic shaft 40 exposed out of the telescopic tube 30, the plurality of the threaded holes 41 of the upper portion of the one end of the telescopic shaft 40 facing towards the first connecting structure 6 are corresponding to the plurality of the through-holes 31 of the lower portion of the one end of the telescopic tube 30 connected with the first connecting structure 6, and the plurality of the threaded holes 41 of an upper portion of the other end of the telescopic shaft 40 are corresponding to the plurality of the through-holes 31 of the lower portion of the other end of the telescopic tube 30, the telescopic shaft 40 is partially fastened to the at least two fastening positions 302 of the telescopic tube 30 by virtue of the plurality of the fastening elements 50 being cooperated with and fastened in the plurality of the threaded holes 41 of the upper portion of the one end of the telescopic shaft 40 and the plurality of the through-holes 31 of the lower portion of the one end of the telescopic tube 30, and the plurality of the fastening elements 50 being cooperated with and fastened in the plurality of the threaded holes 41 of the upper portion of the other end of the telescopic shaft 40 and the plurality of the through-holes 31 of the lower portion of the other end of the telescopic tube 30.

When the telescopic shaft 40 is partially retracted into the telescopic tube 30 to show a second partial length of the telescopic shaft 40 exposed out of the telescopic tube 30, the plurality of the threaded holes 41 of the one end of the telescopic shaft 40 facing towards the first connecting structure 6 are corresponding to the plurality of the through-holes 31 of the other end of the telescopic tube 30 facing towards the second connecting structure 7, the one end of the telescopic shaft 40 is fastened to the at least two fastening positions 302 of the other end of the telescopic tube 30 by virtue of the plurality of the fastening elements 50 being cooperated with and fastened in the plurality of the through-holes 31 of the other end of the telescopic tube 30 and the plurality of the threaded holes 41 of the one end of the telescopic shaft 40.

With reference to FIG. 3 to FIG. 11, the periphery of the telescopic shaft 40 are equipped with a plurality of guiding ribs 42 extending axially and distributed around the periphery of the telescopic shaft 40. Several portions of an inner peripheral surface of the telescopic tube 30 are recessed opposite to the periphery of the telescopic shaft 40 to form a plurality of guiding slots 35. The plurality of the guiding ribs 42 are corresponding to and received in the plurality of the guiding slots 35. When the telescopic shaft 40 is stretched out of the telescopic tube 30 or retracted into the telescopic tube 30, the plurality of the guiding ribs 42 axially slide and are guided in the plurality of the guiding slots 35. When the telescopic shaft 40 is slid along the telescopic tube 30 to be stretched out of the telescopic tube 30 or retracted into the telescopic tube 30, a reliable guidance between the telescopic tube 30 and the telescopic shaft 40 is provided by a corresponding cooperation between the plurality of the guiding ribs 42 and the plurality of the guiding slots 35.

Preferably, the telescopic shaft 40 includes a shaft body 44. Several portions of an outer surface of the periphery of the telescopic shaft 40 are recessed inward to form a plurality of assembling grooves 45 extending axially and distributed around the periphery of the telescopic shaft 40. The plurality of the guiding ribs 42 are corresponding to the plurality of the assembling grooves 45. The plurality of the guiding ribs 42 are assembled in and fastened in the plurality of the assembling grooves 45. Because the shaft body 44 has the plurality of the assembling grooves 45 for fastening the plurality of the guiding ribs 42 in the plurality of the assembling grooves 45 which are corresponding to the plurality of the guiding ribs 42, each guiding rib 42 is manufactured independently to lower a manufacturing difficulty of each guiding rib 42 and to be beneficial for improving a manufacturing accuracy of each guiding rib 42 simultaneously.

In order to make the plurality of the guiding ribs 42 stably assembled in and fastened in the plurality of the assembling grooves 45, inner walls of the plurality of the assembling grooves 45 opposite to an inner surface of the periphery of the telescopic tube 30 define a plurality of screw holes 46 distributed axially and penetrating through the periphery of the telescopic tube 30 along radial directions of the telescopic tube 30. Each guiding rib 42 has a plurality of apertures 47 distributed axially. The plurality of the apertures 47 are corresponding to the plurality of the screw holes 46. The multi-axis robot arm 100 further includes a plurality of screws 401. The plurality of the screws 401 pass through the plurality of the apertures 47, and the plurality of the screws 401 are screwed in and connected to the plurality of the screw holes 46 for fastening the plurality of the guiding ribs 42 to the plurality of the assembling grooves 45.

In order to make the telescopic shaft 40 stably connected with the telescopic tube 30 at the time of the at least one telescopic arm module 3 having the different lengths, the telescopic tube 30 defines the plurality of the through-holes 31 at corresponding positions of the plurality of the guiding slots 35. At least partial guiding ribs 42 form a plurality of perforations 49. At least partial inner walls of the plurality of the assembling grooves 45 opposite to the inner surface of the periphery of the telescopic tube 30 form the plurality of the threaded holes 41. The plurality of the threaded holes 41 are corresponding to the plurality of the perforations 49, so when the telescopic shaft 40 is located at the at least two different fastening positions 302 of the telescopic tube 30 to make the at least one telescopic arm module 3 have the different lengths, namely the different telescopic lengths, the telescopic shaft 40 is fastened with the telescopic tube 30 by virtue of the plurality of the fastening elements 50 which are the plurality of the bolts passing through the plurality of the through-holes 31 and the plurality of the perforations 49, and the plurality of the fastening elements 50 are screwed in and connected to the plurality of the corresponding threaded holes 41.

Figure 5:
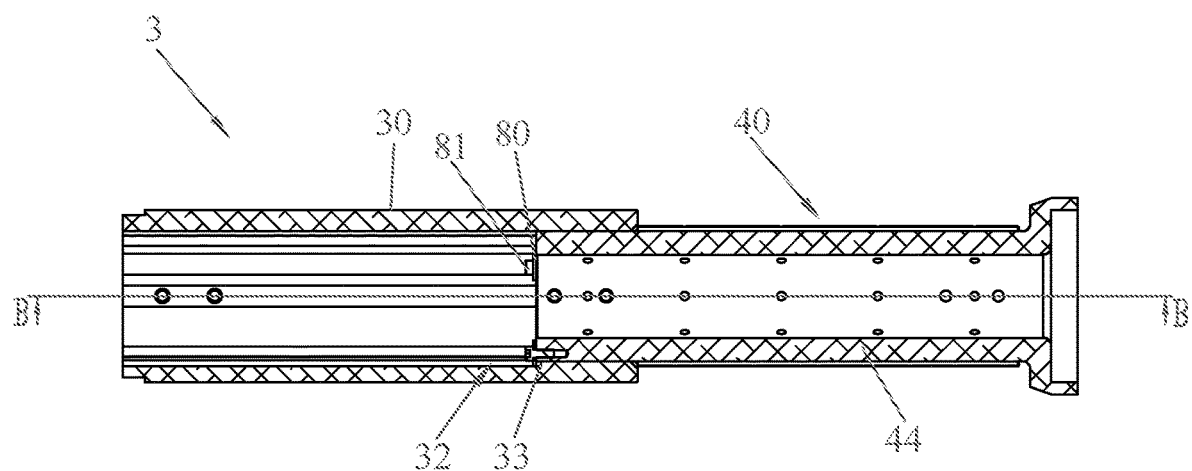
FIG. 5 is a sectional view of the telescopic arm module of the multi-axis robot arm along a line A-A of FIG. 4.
Figure 6:
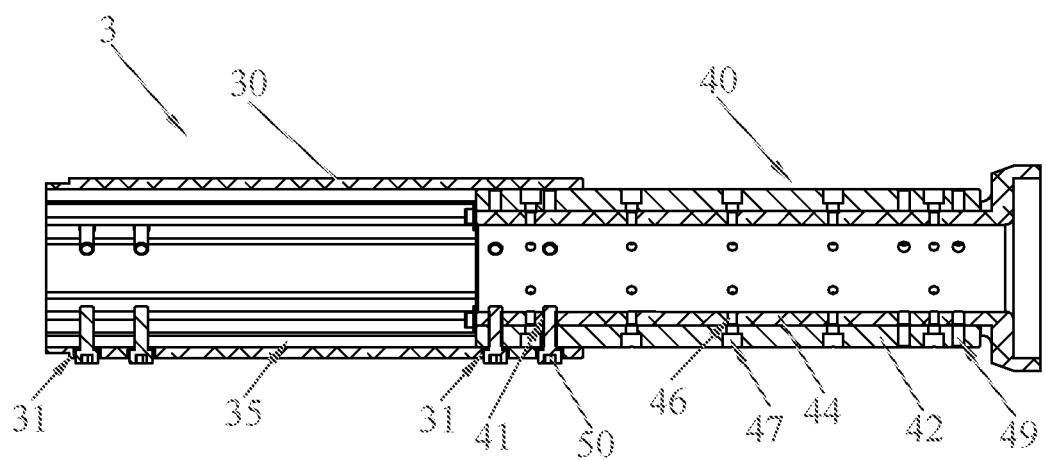
FIG. 6 is a sectional view of the telescopic arm module of the multi-axis robot arm along a line B-B of FIG. 5.
Figure 7:
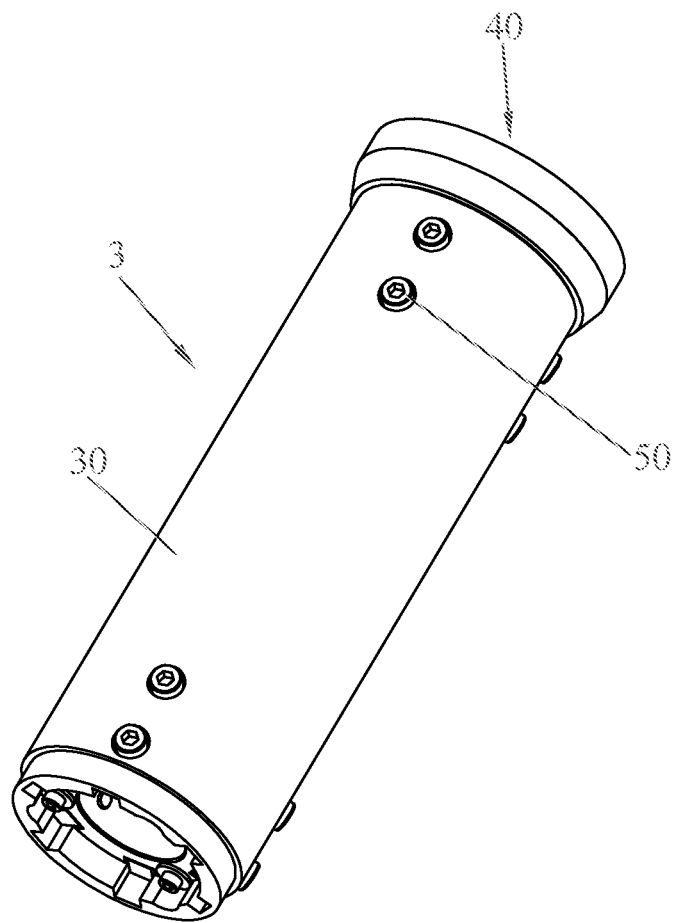
FIG. 7 is a diagrammatic drawing showing that the telescopic arm module of the multi-axis robot arm of FIG. 1, wherein the telescopic arm module of the multi-axis robot arm is located at a retracted status.
Figure 8:
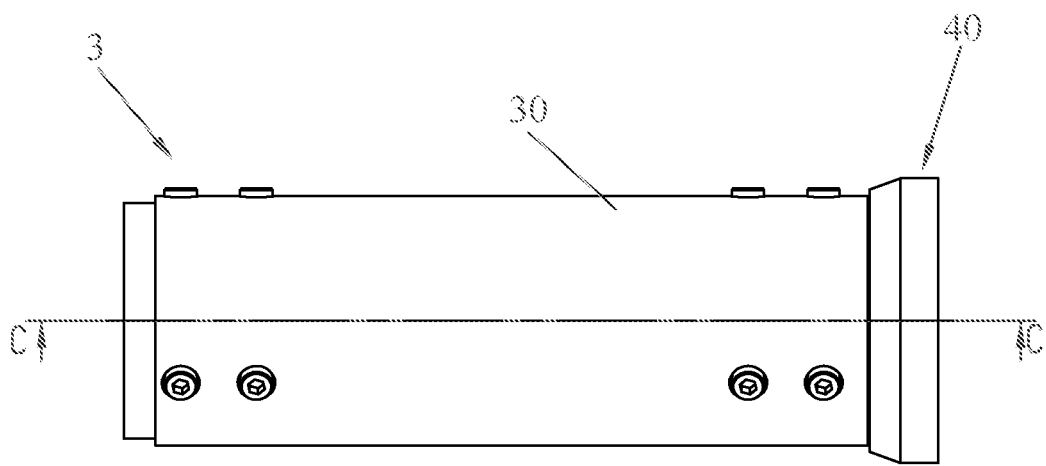
FIG. 8 is a schematic drawing showing that a plane structure of the telescopic arm module of the multi-axis robot arm is located at the retracted status.
Figure 9:
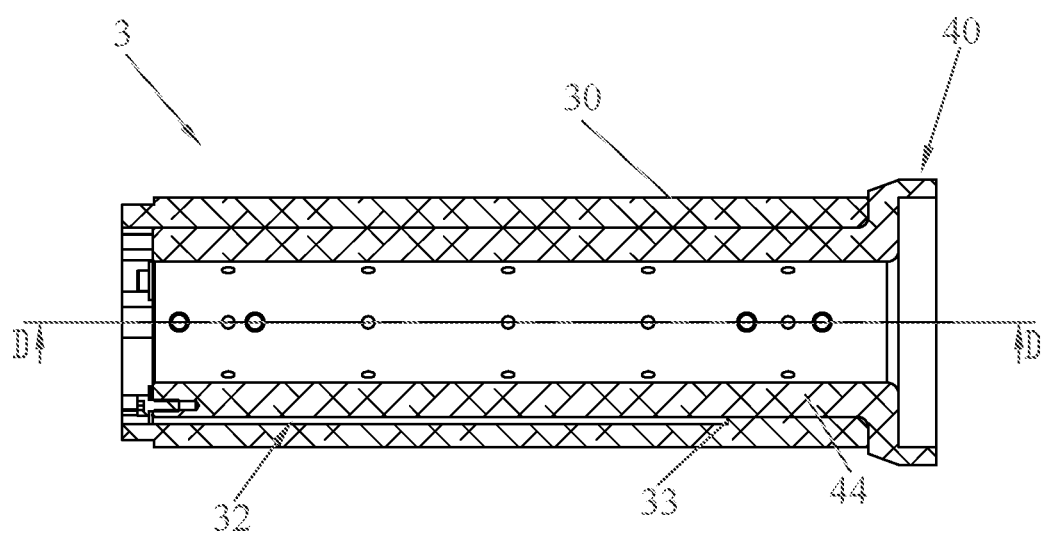
FIG. 9 is a sectional view of the telescopic arm module of the multi-axis robot arm along a line C-C of FIG. 8.
Figure 10:
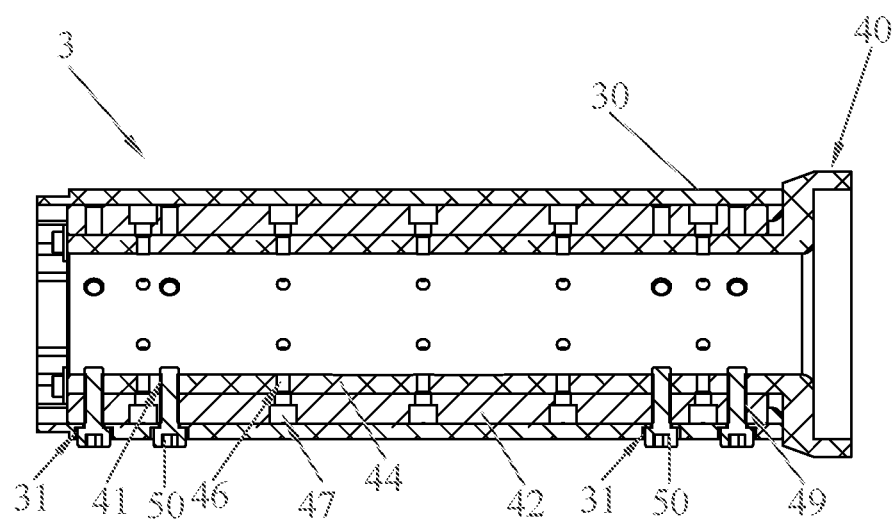
FIG. 10 is a sectional view of the telescopic arm module of the multi-axis robot arm along a line D-D of FIG. 9.
Figure 11:
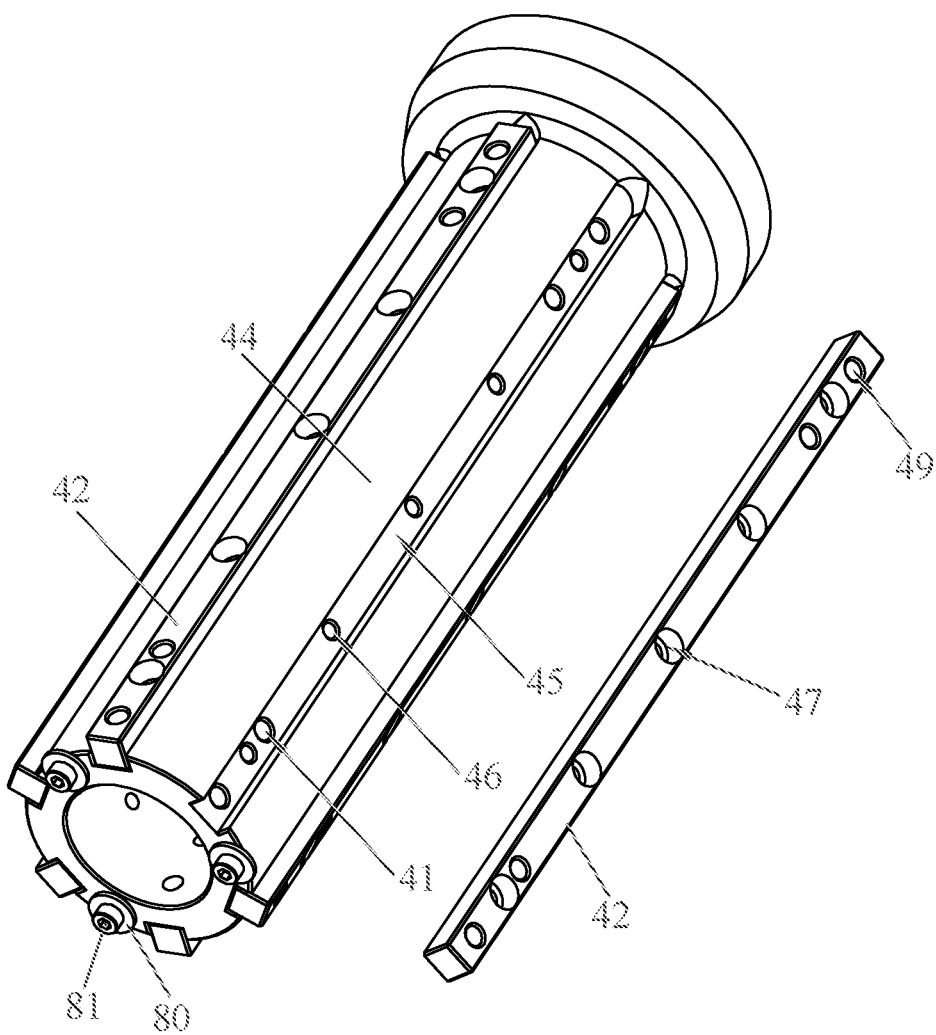
FIG. 11 is an exploded view of a telescopic shaft of the multi-axis robot arm, wherein a plurality of screws and other structures are omitted.
Figure 12:
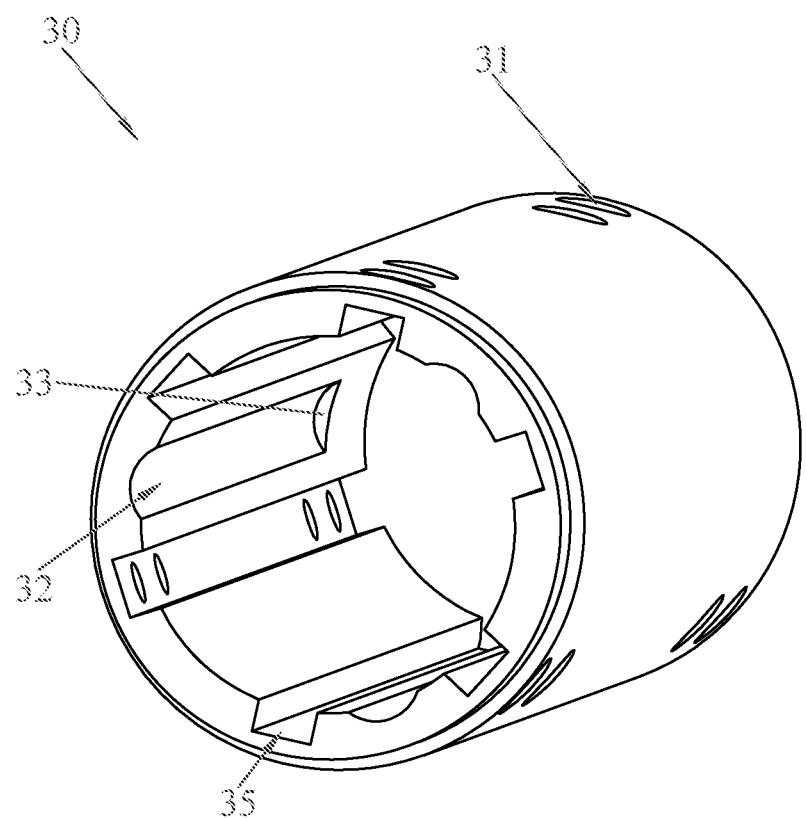
FIG. 12 is a perspective view of a telescopic tube of the multi-axis robot arm in accordance with the preferred embodiment of the present invention.

With reference to FIG. 1, FIG. 5 and FIG. 6, in the present invention, the telescopic shaft 40 is shown as a sleeve shape, and two opposite ends of the hollow telescopic tube 30 are opened freely to facilitate for the multi-axis robot arm 100 to arrange wires. Under a condition of realizing the at least one telescopic arm module 3 to be adjusted telescopically by designs of the hollow telescopic tube 30 and the telescopic shaft 40, a wire arrangement of the multi-axis robot arm 100 will be without being affected.

With reference to FIG. 5 to FIG. 12, in the present invention, several portions of the inner peripheral surface of the telescopic tube 30 are recessed opposite to the telescopic shaft 40 to form a plurality of recesses 32 extending axially. One end of each recess 32 passes through a surface of the one end of the telescopic tube 30 connected with the first connecting structure 6. The inner peripheral surface of the telescopic tube 30 has a blocking wall 33 located at and connected to the other end of each recess 32. A surface of the one end of the telescopic shaft 40 facing towards the first connecting structure 6 is equipped with a plurality of stopping elements 80. The plurality of the stopping elements 80 partially project beyond the outer surface of the periphery of the telescopic shaft 40, and the plurality of the stopping elements 80 are slidably disposed in the plurality of the corresponding recesses 32. Portions of the plurality of the stopping elements 80 projecting beyond the outer surface of the periphery of the telescopic shaft 40 are arc shapes. The plurality of the stopping elements 80 are capable of sliding in the plurality of the corresponding recesses 32 axially. The plurality of the stopping elements 80 in the plurality of the corresponding recesses 32 are blocked by the blocking walls 33 connected to the plurality of the corresponding recesses 32. The telescopic shaft 40 is prevented breaking away from the telescopic tube 30 by designs of the plurality of the corresponding recesses 32, the blocking walls 33 connected to the plurality of the corresponding recesses 32 and the plurality of the stopping elements 80 to effectively ensure a telescopic reliability and a sliding reliability.

Preferably, the plurality of the stopping elements 80 are blocking pieces. The multi-axis robot arm 100 further includes a plurality of screwing elements 81. The plurality of the stopping elements 80 are fastened to the surface of the one end of the telescopic shaft 40 facing towards the first connecting structure 6 by the plurality of the screwing elements 81. Inner walls of the plurality of the recesses 32 are shown as the arc shapes and are matched with the portions of the plurality of the stopping elements 80 projecting beyond the outer surface of the periphery of the telescopic shaft 40 so as to quickly and stably fasten the plurality of the stopping elements 80 on the surface of the one end of the telescopic shaft 40 and in the plurality of the recesses 32, and ensure a blocking reliability.

With reference to FIG. 1 and FIG. 2, in the present invention, the first connecting structure 6 and the second connecting structure 7 located between each two adjacent knuckle modules 2 are spaced from the pedestal 1 and are defined as a connecting structure group 607. The multi-axis robot arm 100 includes two connecting structure groups 607. In each connecting structure group 607, a distance between the first connecting structure 6 and the pedestal 1 is larger than a distance between the second connecting structure 7 and the pedestal 1. Nonetheless, in each connecting structure group 607, the distance between the first connecting structure 6 and the pedestal 1 is without being limited to be larger than the distance between the second connecting structure 7 and the pedestal 1.

In order to realize that the telescopic tube 30 is fastened to and connected with the first connecting structure 6 reliably, the first connecting structure 6 is chosen as a nested structure or a loop structure etc. A specific structure of the hollow telescopic tube 30 corresponding to and cooperated with the first connecting structure 6 is chosen as the loop structure or the nested structure. As long as the specific structures of the first connecting structure 6 and the hollow telescopic tube 30 play a reliable fixation action, the specific structures of the first connecting structure 6 and the hollow telescopic tube 30 are without being limited to the preferred embodiment of the present invention.

Simultaneously, in order to realize a reliable fixation and connection between the telescopic shaft 40 and the second connecting structure 7, a specific structure of the second connecting structure 7 is chosen as the nested structure or the loop structure etc. A specific structure of the corresponding telescopic shaft 40 cooperated with the second connecting structure 7 is chosen as the loop structure or the nested structure etc. As long as the specific structures of the second connecting structure 7 and the telescopic shaft 40 play a reliable fixation action, the specific structures of the second connecting structure 7 and the telescopic shaft 40 are without being limited to the preferred embodiment of the present invention.

In the present invention, the telescopic tube 30 is made of an aluminum alloy, and the telescopic tube 30 is without being limited to be made of the aluminum alloy.

With reference to FIG. 1 to FIG. 3, in the preferred embodiment, the multi-axis robot arm 100 is a six-axis robot arm. The multi-axis robot arm 100 includes the pedestal 1, a first knuckle module 21, a second knuckle module 22, a third knuckle module 23, a fourth knuckle module 24, a fifth knuckle module 25, a sixth knuckle module 26, two telescopic arm modules 3, two first connecting structures 6, two second connecting structures 7 and a bending tube 9.

Specifically, the first knuckle module 21 is connected with a top of the pedestal 1. The second knuckle module 22 is connected with one side of the first knuckle module 21. The third knuckle module 23 is located above the second knuckle module 22. A bottom of the third knuckle module 23 has one first connecting structure 6. A top of the second knuckle module 22 has one second connecting structure 7 facing to the one first connecting structure 6. One telescopic arm module 3 is connected between the one first connecting structure 6 and the one second connecting structure 7. The one telescopic arm module 3 is connected between the second knuckle module 22 and the third knuckle module 23. The first knuckle module 21 is nearest to the pedestal 1 among the plurality of the knuckle modules 2.

The other telescopic arm module 3 is connected between the third knuckle module 23 and the fourth knuckle module 24. One side of the third knuckle module 23 is connected with the bending tube 9, and the bending tube 9 is located above the first knuckle module 21. A top of the bending tube 9 has the other second connecting structure 7. One side of the third knuckle module 23 is connected with the other independent second connecting structure 7 by the bending tube 9. Of course, the bending tube 9 and the other second connecting structure 7 are also a one-piece structure, namely the bending tube 9 is a part of the other second connecting structure 7. A bottom of the fourth knuckle module 24 is connected with the other first connecting structure 6 facing to the other second connecting structure 7. The other telescopic arm module 3 is connected between the other first connecting structure 6 and the other second connecting structure 7. The fourth knuckle module 24, the other first connecting structure 6, the other second connecting structure 7 and the bending tube 9 are located above the pedestal 1. One side of the fifth knuckle module 25 is connected with the fourth knuckle module 24. A top of the fifth knuckle module 25 is connected with a bottom of the sixth knuckle module 26. The sixth knuckle module 26 and the fifth knuckle module 25 are located above the third knuckle module 23.

As described above, the multi-axis robot arm 100 includes the at least one telescopic arm module 3, the at least one telescopic arm module 3 includes the telescopic tube 30 and the telescopic shaft 40 which are cooperated with each other, the length of the at least one telescopic arm module 3 is steadily modulated by virtue of the telescopic shaft 40 being axially stretched out of or retracted into the telescopic tube 30, when the telescopic shaft 40 is stretched out of or retracted into the telescopic tube 30 to generate different lengths of the telescopic shaft 40 exposed out of the telescopic tube 30, the telescopic shaft 40 is realized to be fastened to the telescopic tube 30 by the action of the plurality of the fastening elements 50, so that when the at least one telescopic arm module 3 has the different lengths, the at least one telescopic arm module 3 is used reliably to make the multi-axis robot arm 100 appropriate to the different usage needs for improving the usage scope of the multi-axis robot arm 100.

The above-mentioned description is just the preferred embodiment of the present invention, a patent application scope of the present invention is without being limited to the preferred embodiment, so an equivalent change made according to the patent application scope of the present invention still belongs to the patent application scope of the present invention.

What is claimed is:

1. A multi-axis robot arm, comprising:
   a pedestal;
   a plurality of knuckle modules, two ends of each knuckle module having a first connecting structure and a second connecting structure, respectively; and
   at least one telescopic arm module connecting between the two adjacent knuckle modules, the telescopic arm module including a telescopic tube and a telescopic shaft, one end of the telescopic tube being connected with and fastened to the first connecting structure, the other end of the telescopic tube facing towards the second connecting structure, one end of the telescopic shaft facing towards the first connecting structure and being inserted into the other end of the telescopic tube, the other end of the telescopic shaft being fastened to and connected with the second connecting structure, the one end of the telescopic shaft being telescopically connected with and fastened in the telescopic tube, the telescopic shaft being axially retracted into or stretched out of the telescopic tube with respect to the telescopic tube, the telescopic shaft being fastened to at least two different fastening positions of the telescopic tube by a plurality of fastening elements, wherein the at least one telescopic arm module, and the plurality of the knuckle modules together with the first connecting structures and the second connecting structures of the plurality of the knuckle modules are fastened to the pedestal;
   wherein the telescopic shaft has a plurality of threaded holes distributed around a periphery of the telescopic shaft, the telescopic tube has a plurality of through-holes distributed around a periphery of the telescopic tube, the plurality of the through-holes are corresponding to the plurality of the threaded holes, the plurality of the fastening elements pass through the plurality of the through-holes, and the plurality of the fastening elements are screwed in the plurality of the threaded holes and connected with inner side walls of the plurality of the threaded holes by a threaded connection way to locate the telescopic shaft to the at least two different fastening positions of the telescopic tube.

2. The multi-axis robot arm as claimed in claim 1, wherein the plurality of the fastening elements are a plurality of bolts.

3. The multi-axis robot arm as claimed in claim 1, wherein a periphery of the telescopic shaft are equipped with a plurality of guiding ribs extending axially and distributed around the periphery of the telescopic shaft, several portions of an inner peripheral surface of the telescopic tube are recessed opposite to the periphery of the telescopic shaft to form a plurality of guiding slots, the plurality of the guiding ribs are corresponding to and received in the plurality of the guiding slots, when the telescopic shaft is stretched out of the telescopic tube or retracted into the telescopic tube, the plurality of the guiding ribs axially slide and are guided in the plurality of the guiding slots.

4. The multi-axis robot arm as claimed in claim 3, wherein the telescopic shaft includes a shaft body, several portions of an outer surface of the periphery of the telescopic shaft are recessed inward to form a plurality of assembling grooves extending axially and distributed around the periphery of the telescopic shaft, the plurality of the guiding ribs are corresponding to the plurality of the assembling grooves, the plurality of the guiding ribs are assembled in and fastened in the plurality of the assembling grooves.

5. The multi-axis robot arm as claimed in claim 4, wherein inner walls of the plurality of the assembling grooves opposite to an inner surface of a periphery of the telescopic tube define a plurality of screw holes distributed axially and penetrating through the periphery of the telescopic tube along radial directions of the telescopic tube, each guiding rib has a plurality of apertures distributed axially, the plurality of the apertures are corresponding to the plurality of the screw holes, the multi-axis robot arm further includes a plurality of screws, the plurality of the screws pass through the plurality of the apertures, and the plurality of the screws are screwed in and connected to the plurality of the screw holes for fastening the plurality of the guiding ribs to the plurality of the assembling grooves.

6. The multi-axis robot arm as claimed in claim 4, wherein the telescopic tube defines a plurality of through-holes at corresponding positions of the plurality of the guiding slots, at least partial guiding ribs form a plurality of perforations, at least partial inner walls of the plurality of the assembling grooves opposite to an inner surface of the periphery of the telescopic tube form a plurality of threaded holes corresponding to the plurality of the perforations, so when the telescopic shaft is located at the at least two different fastening positions of the telescopic tube to make the at least one telescopic arm module have different lengths, the telescopic shaft is fastened with the telescopic tube by virtue of the plurality of the fastening elements passing through the plurality of the through-holes and the plurality of the perforations, and the plurality of the fastening elements are screwed in and connected to the plurality of the corresponding threaded holes.

7. The multi-axis robot arm as claimed in claim 1, wherein several portions of an inner peripheral surface of the telescopic tube are recessed opposite to the telescopic shaft to form a plurality of recesses extending axially, one end of each recess passes through a surface of the one end of the telescopic tube connected with the first connecting structure, the inner peripheral surface of the telescopic tube has a blocking wall located at and connected to the other end of each recess, a surface of the one end of the telescopic shaft facing towards the first connecting structure is equipped with a plurality of stopping elements, the plurality of the stopping elements partially project beyond an outer surface of a periphery of the telescopic shaft, and the plurality of the stopping elements are slidably disposed in the plurality of the corresponding recesses, the plurality of the stopping elements in the plurality of the corresponding recesses are blocked by the blocking walls connected to the plurality of the corresponding recesses.

8. The multi-axis robot arm as claimed in claim 7, wherein portions of the plurality of the stopping elements projecting beyond the outer surface of the periphery of the telescopic shaft are arc shapes, inner walls of the plurality of the recesses are shown as the arc shapes and are matched with the portions of the plurality of the stopping elements projecting beyond the outer surface of the periphery of the telescopic shaft.

9. The multi-axis robot arm as claimed in claim 7, further comprising a plurality of screwing elements, the plurality of the stopping elements being fastened to the surface of the one end of the telescopic shaft facing towards the first connecting structure by the plurality of the screwing elements.

10. The multi-axis robot arm as claimed in claim 1, wherein a distance between the first connecting structure and the pedestal is larger than a distance between the second connecting structure and the pedestal.

11. A multi-axis robot arm, comprising:
a pedestal;
a first knuckle module connected with a top of the pedestal;
a second knuckle module connected with one side of the first knuckle module;
a third knuckle module located above the second knuckle module;
two first connecting structures, a bottom of the third knuckle module having one first connecting structure;
two second connecting structures, a top of the second knuckle module having one second connecting structure facing to the one first connecting structure, one side of the third knuckle module being connected with the other second connecting structure;
two telescopic arm modules, one telescopic arm module being connected between the one first connecting structure and the one second connecting structure, the one telescopic arm module being connected between the second knuckle module and the third knuckle module;
a fourth knuckle module, a bottom of the fourth knuckle module being connected with the other first connecting structure facing to the other second connecting structure, the other telescopic arm module being connected between the other first connecting structure and the other second connecting structure, the other telescopic arm module being connected between the third knuckle module and the fourth knuckle module, the fourth knuckle module, the other first connecting structure and the other second connecting structure being located above the pedestal;
a fifth knuckle module, one side of the fifth knuckle module being connected with the fourth knuckle module; and
a sixth knuckle module, a top of the fifth knuckle module being connected with a bottom of the sixth knuckle module, the sixth knuckle module and the fifth knuckle module being located above the third knuckle module.

12. A multi-axis robot arm, comprising:
a pedestal;
a first knuckle module connected with a top of the pedestal;
a second knuckle module connected with one side of the first knuckle module;
a third knuckle module located above the second knuckle module;
two first connecting structures, a bottom of the third knuckle module having one first connecting structure;
two second connecting structures, a top of the second knuckle module having one second connecting structure facing to the one first connecting structure;
a bending tube, one side of the third knuckle module being connected with the bending tube, and the bending tube being located above the first knuckle module, a top of the bending tube having the other second connecting structure, the one side of the third knuckle module being connected with the other second connecting structure by the bending tube;
two telescopic arm modules, one telescopic arm module being connected between the one first connecting structure and the one second connecting structure, the one telescopic arm module being connected between the second knuckle module and the third knuckle module;
a fourth knuckle module, a bottom of the fourth knuckle module being connected with the other first connecting structure facing to the other second connecting structure, the other telescopic arm module being connected between the other first connecting structure and the other second connecting structure, the other telescopic arm module being connected between the third knuckle module and the fourth knuckle module, the fourth knuckle module, the other first connecting structure, the other second connecting structure and the bending tube being located above the pedestal;

a fifth knuckle module, one side of the fifth knuckle module being connected with the fourth knuckle module; and a sixth knuckle module, a top of the fifth knuckle module being connected with a bottom of the sixth knuckle module, the sixth knuckle module and the fifth knuckle module being located above the third knuckle module.

* * * * *